(12) United States Patent
Sprague et al.

(10) Patent No.: US 8,788,405 B1
(45) Date of Patent: Jul. 22, 2014

(54) GENERATING DATA CLUSTERS WITH CUSTOMIZABLE ANALYSIS STRATEGIES

(71) Applicant: Palantir Technologies, Inc., Palo Alto, CA (US)

(72) Inventors: Matthew Sprague, Palo Alto, CA (US); Michael Kross, Palo Alto, CA (US); Adam Borochoff, Palo Alto, CA (US); Parvathy Menon, Palo Alto, CA (US); Michael Harris, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 13/968,265

(22) Filed: Aug. 15, 2013

Related U.S. Application Data

(60) Provisional application No. 61/800,887, filed on Mar. 15, 2013.

(51) Int. Cl.
*G06Q 40/00* (2012.01)
(52) U.S. Cl.
CPC .................................... *G06Q 40/00* (2013.01)
USPC ............................................. 705/38; 705/35
(58) Field of Classification Search
CPC ............................. G06Q 40/00; G06Q 40/025
USPC ................................................ 705/35, 38, 40
See application file for complete search history.

(56) References Cited

U.S. PATENT DOCUMENTS

| | | | |
|---|---|---|---|
| 7,373,669 B2 | 5/2008 | Eisen | |
| 7,783,658 B1 | 8/2010 | Bayliss | |
| 7,814,102 B2 | 10/2010 | Miller et al. | |
| 8,046,362 B2 | 10/2011 | Bayliss | |
| 8,135,679 B2 | 3/2012 | Bayliss | |
| 8,135,719 B2 | 3/2012 | Bayliss | |
| 8,266,168 B2 | 9/2012 | Bayliss | |
| 8,321,943 B1 | 11/2012 | Walters et al. | |
| 8,347,398 B1 | 1/2013 | Weber | |
| 8,447,674 B2 * | 5/2013 | Choudhuri et al. | 705/35 |
| 8,484,168 B2 | 7/2013 | Bayliss | |
| 8,495,077 B2 | 7/2013 | Bayliss | |
| 8,498,969 B2 | 7/2013 | Bayliss | |

(Continued)

FOREIGN PATENT DOCUMENTS

WO      WO 2013/126281      8/2013

OTHER PUBLICATIONS

Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.

(Continued)

*Primary Examiner* — Lalita M Hamilton
(74) *Attorney, Agent, or Firm* — Knobbe, Martens, Olson & Bear, LLP

(57) ABSTRACT

Techniques are disclosed for generating a collection of clusters of related data from a seed. Doing so may generally include retrieving a seed and adding the seed to a first cluster and include retrieving a cluster strategy referencing one or more data bindings. Each data binding specifies a search protocol for retrieving data. For each of the one or more data bindings, data parameters input to the search protocol are identified, the search protocol is performed using the identified data parameters, and data returned by the search protocol is evaluated for inclusion in the first cluster.

18 Claims, 10 Drawing Sheets

(56) References Cited

U.S. PATENT DOCUMENTS

| | | | |
|---|---|---|---|
| 8,600,872 B1* | 12/2013 | Yan | 705/38 |
| 2003/0097330 A1* | 5/2003 | Hillmer et al. | 705/38 |
| 2009/0018940 A1* | 1/2009 | Wang et al. | 705/35 |
| 2009/0044279 A1 | 2/2009 | Crawford et al. | |
| 2009/0083184 A1* | 3/2009 | Eisen | 705/50 |
| 2009/0192957 A1* | 7/2009 | Subramanian et al. | 706/21 |
| 2010/0077483 A1 | 3/2010 | Stolfo et al. | |
| 2010/0125546 A1 | 5/2010 | Barrett et al. | |
| 2010/0306029 A1 | 12/2010 | Jolley | |
| 2011/0087519 A1 | 4/2011 | Fordyce, III et al. | |
| 2011/0167493 A1 | 7/2011 | Song et al. | |
| 2011/0173093 A1 | 7/2011 | Psota et al. | |
| 2011/0231223 A1 | 9/2011 | Winters | |
| 2011/0238510 A1 | 9/2011 | Rowen et al. | |
| 2011/0238570 A1* | 9/2011 | Li et al. | 705/40 |
| 2011/0307382 A1* | 12/2011 | Siegel et al. | 705/44 |
| 2012/0084135 A1 | 4/2012 | Nissan et al. | |
| 2012/0084866 A1 | 4/2012 | Stolfo | |
| 2012/0215898 A1 | 8/2012 | Shah et al. | |
| 2012/0310831 A1 | 12/2012 | Harris et al. | |
| 2012/0310838 A1 | 12/2012 | Harris et al. | |
| 2013/0024307 A1 | 1/2013 | Fuerstenberg et al. | |
| 2013/0024339 A1* | 1/2013 | Choudhuri et al. | 705/35 |
| 2013/0160120 A1 | 6/2013 | Malaviya et al. | |
| 2013/0211985 A1* | 8/2013 | Clark et al. | 705/35 |
| 2013/0232045 A1 | 9/2013 | Tai et al. | |
| 2013/0318594 A1 | 11/2013 | Hoy et al. | |
| 2013/0339218 A1* | 12/2013 | Subramanian et al. | 705/38 |
| 2014/0006109 A1* | 1/2014 | Callioni et al. | 705/7.35 |

OTHER PUBLICATIONS

Official Communication in New Zealand Application No. 622181 dated Mar. 24, 2014.

* cited by examiner

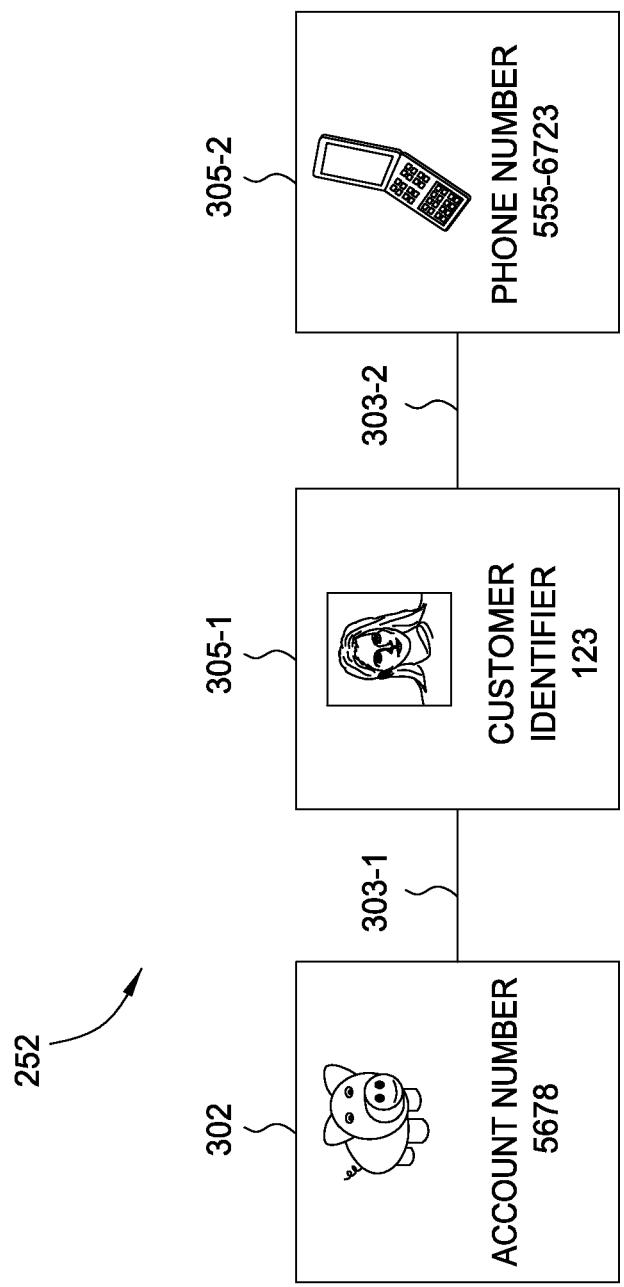

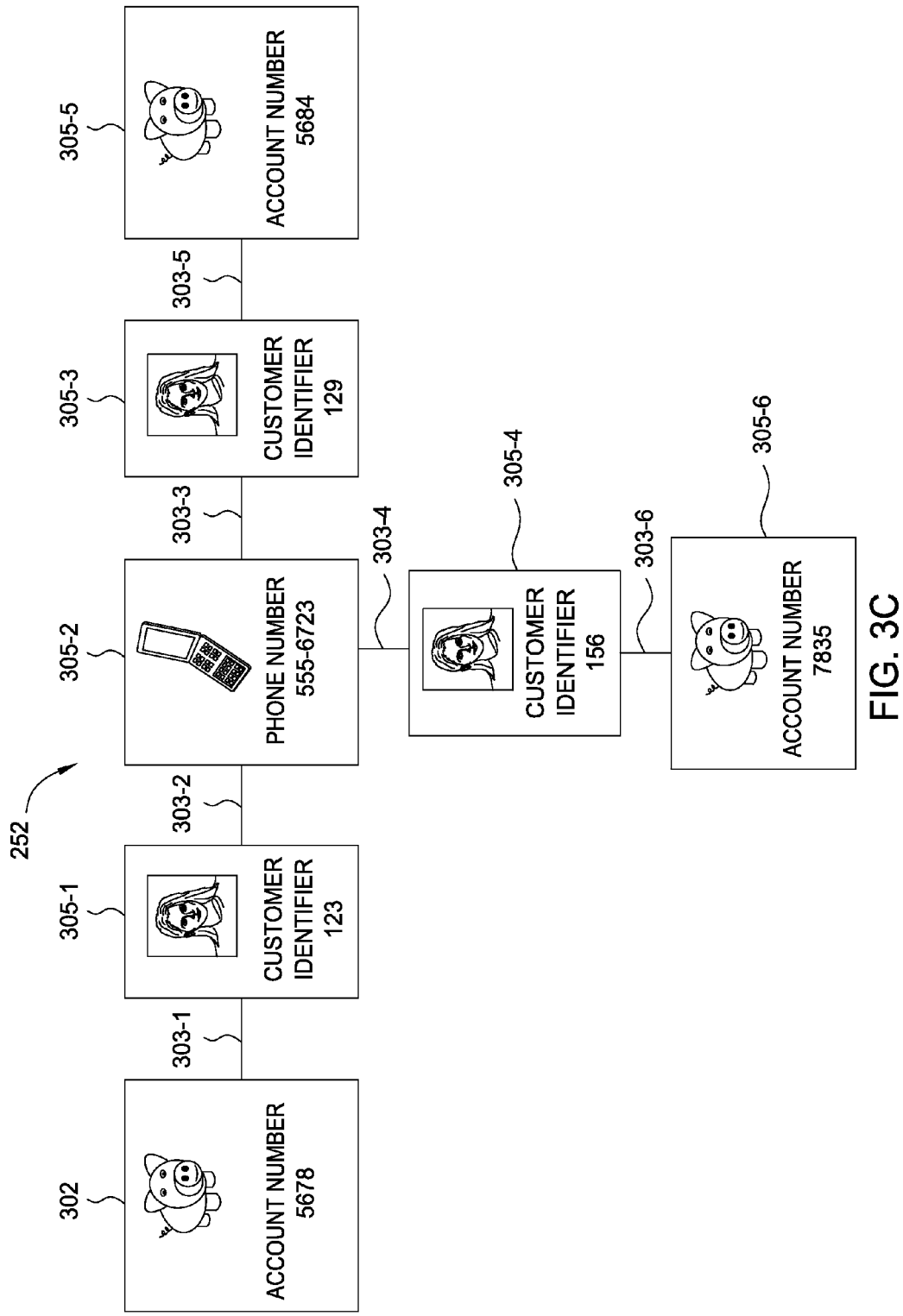

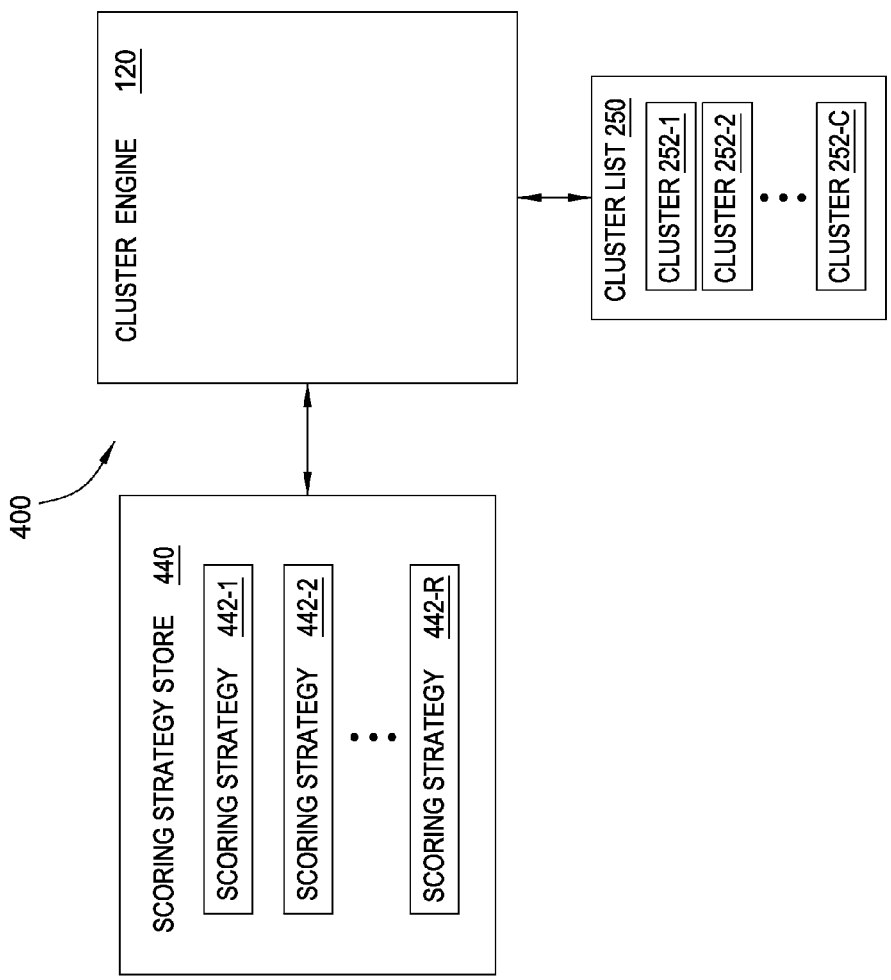

GENERATING DATA CLUSTERS WITH CUSTOMIZABLE ANALYSIS STRATEGIES

CROSS-REFERENCE TO RELATED APPLICATION

This application claims benefit of U.S. Provisional Patent Application Ser. No. 61/800,887 filed Mar. 15, 2013, which is incorporated herein by reference in its entirety.

BACKGROUND OF THE INVENTION

1. Field of the Invention

Embodiments of the present invention generally relate to data analysis and, more specifically, to generating data clusters of related data entities with customizable analysis strategies.

2. Description of the Related Art

In financial and security investigations an analyst may have to make decisions regarding data entities within a collection of data. For instance, the analyst could have to decide whether an account data entity represents a fraudulent bank account. However, an individual data entity oftentimes includes insufficient information for the analyst to make such decisions. The analyst makes better decisions based upon a collection of related data entities. For instance, two financial transactions may be related by an identical account identifier or two accounts belonging to one customer may be related by an identical customer identifier or other attribute (e.g., a shared phone number or address). Some currently available systems assist the analyst by identifying data entities that are directly related to an initial data entity. For example, the analyst could initiate an investigation with a single suspicious data entity or "seed," such as a fraudulent credit card account. If the analyst examined this data entity by itself, then the analyst would not observe any suspicious characteristics. However, the analyst could request a list of data entities related to the seed by a shared attribute, such as a customer identifier. In doing so, the analyst could discover an additional data entity, such as an additional credit card account, which relates to the original fraudulent account because of a shared customer identifier. The analyst could then mark the additional credit card account as potentially fraudulent, based upon the relationship of the shared customer identifier.

Although these systems can be very helpful in discovering related data entities, they typically require the analyst to manually repeat the same series of searches for many investigations. Repeating the same investigation process consumes time and resources, such that there are oftentimes more investigations than can be performed. Thus, analysts typically prioritize investigations based upon the characteristics of the seeds. However, there may be insignificant differences between the seeds, so the analyst may not be able to determine the correct priority for investigations. For instance, the analyst could have to choose between two potential investigations based upon separate fraudulent credit card accounts. One investigation could reveal more potentially fraudulent credit card accounts than the other, and therefore could be more important to perform. Yet, the characteristics of the two original credit card accounts could be similar, so the analyst would not be able to choose the more important investigation. Without more information, prioritizing investigations is difficult and error prone.

SUMMARY OF THE INVENTION

One embodiment of the present invention includes a method for generating a cluster of related data from a seed. This method may generally include retrieving a seed and adding the seed to a first cluster. This method may further include retrieving a cluster strategy referencing one or more data bindings. Each data binding specifies a search protocol for retrieving data. For each of the one or more data bindings, data parameters input to the search protocol are identified, the search protocol is performed using the identified data parameters, and data returned by the search protocol is evaluated for inclusion in the first cluster.

In a particular embodiment, the search protocol for a first one of the data bindings uses the seed as the data parameters input to the search protocol. Further, the search protocol for a first one of the data bindings returns data used as the identified data parameters input to the search protocol for a second one of the data bindings. This process may iteratively continue until all data bindings in the search strategy have been executed for all available data obtained while growing the first cluster.

In a particular embodiment, this method may further include retrieving a second cluster from a plurality of clusters, comparing data from the first cluster to data from the second cluster, and determining whether to merge the first cluster and the second cluster based on the comparison.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

Advantageously, the disclosed techniques provide a more effective starting point for an investigation of financial and security data entities. An analyst is able to start the investigation from a cluster of related data entities instead of an individual data entity, which may reduce the amount of time and effort required to perform the investigation. The disclosed techniques also provide a prioritization of multiple clusters. The analyst is also able to start the investigation from a high priority cluster, which may allow the analyst to focus on the most important investigations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3C illustrate the growth of a cluster of related data entities, according to one embodiment.

FIG. 4 illustrates the ranking of clusters by the data analysis system, according to one embodiment of the present invention.

DETAILED DESCRIPTION

Figure 1:
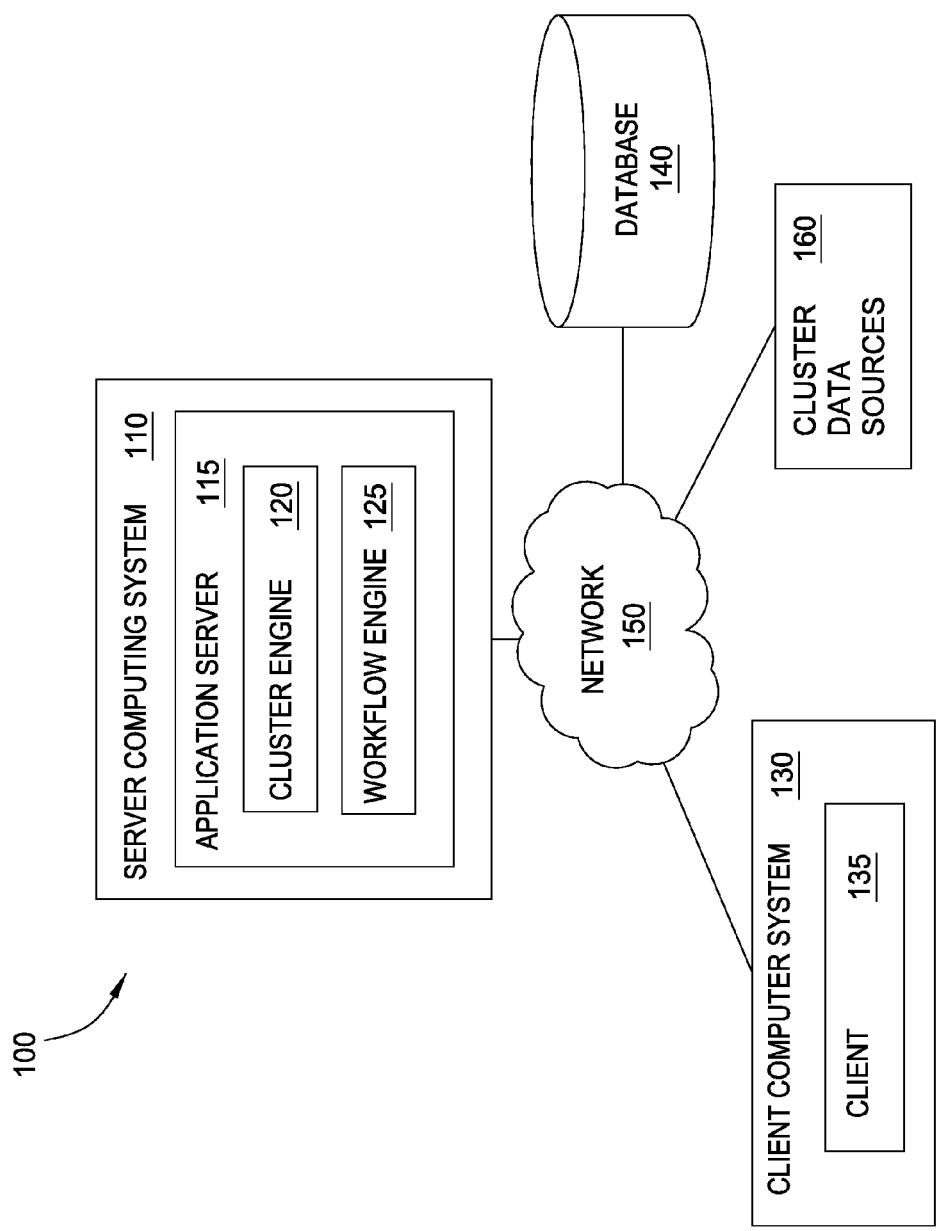
FIG. 1 is a block diagram illustrating an example data analysis system, according to one embodiment.

Embodiments of the invention provide techniques for building clusters of related data from an initial data entity, called a seed. The seed and related data entities may be available from databases maintained by a financial institution. Such databases may include a variety of information, such as credit card accounts, customer identifiers, customer information, and transactions, as well as the relationships that link those data entities together, stored across different systems controlled by different entities. Embodiments bring together data from multiple datasets such as these to build clusters. To perform financial and security investigations related to the seed, an analyst may have to search several layers of related data entities. For example, the analyst could investigate data entities related to a seed credit card account, by discovering the customer identifiers associated with the credit card account, the phone numbers associated with those customer identifiers, the additional customer identifiers associated with those phone numbers, and finally the additional credit card accounts associated with those additional customer identifiers. If the seed credit card account were fraudulent, then the analyst could determine that the additional credit card accounts could also be fraudulent. In such an investigation, the analyst would discover the relationship between the additional credit card accounts and the seed credit card accounts through several layers of related data entities. This technique is particularly valuable for investigations where the relationship between data entities could include several layers and would be difficult to identify.

In one embodiment, the data analysis system automatically discovers data entities related to a seed and stores the resulting relationships and related data entities together in a "cluster." A cluster generation strategy specifies what searches to perform at each step of the investigation process. The searches produce layers of related data entities to add to the cluster. Thus, the analyst starts an investigation with the resulting cluster, instead of the seed alone. Starting with the cluster, the analyst may form opinions regarding the related data entities, conduct further analysis of the related data entities, or may query for additional related data entities. Further, for numerous such seeds and associated investigations, the data analysis system may prioritize the clusters based upon an aggregation of characteristics of the related data entities within the clusters. The data analysis system then displays summaries of the clusters. The summaries may be displayed according to the prioritization. The prioritization may assist the analyst in selecting what clusters to investigate.

In the following description, numerous specific details are set forth to provide a more thorough understanding of the present invention. However, it will be apparent to one of skill in the art that the present invention may be practiced without one or more of these specific details.

FIG. 1 is a block diagram illustrating an example data analysis system 100, according to one embodiment of the present invention. As shown, the data analysis system 100 includes an application server 115 running on a server computing system 110, a client 135 running on a client computer system 130, and at least one database 140. Further, the client 135, application server 115, and database 140 may communicate over a network 150, e.g., to access cluster data sources 160.

The application server 115 includes a cluster engine 120 and a workflow engine 125. The cluster engine 120 is configured to build one or more clusters of related data entities, according to a defined analysis strategy. The cluster engine 120 may read data from a variety cluster data sources 160 to generate clusters from seed data. Once created, the resulting clusters may be stored on the server computer 110 or on the database 140. The operations of the cluster engine 120 are discussed in detail below in conjunction with FIGS. 2 and 3.

The cluster engine 120 is configured to score the clusters, according to a defined scoring strategy. The score may indicate the importance of analyzing the cluster. For instance, the cluster engine 120 could execute a scoring strategy that aggregates the account balances of credit card accounts within the cluster. If the cluster included a larger total balance than other clusters, then the cluster could be a greater liability for the financial institution. Thus, the cluster would be more important to analyze and would receive a higher score. In one embodiment, the cluster engine 120 organizes and presents the clusters according to the assigned scores. The cluster engine 120 may present summaries of the clusters and/or interactive representations of the clusters within the cluster analysis UI. For example, the representations may provide visual graphs of the related data entities within the clusters. The cluster engine 120 may generate the cluster analysis UI as a web application or a dynamic web page displayed within the client 135. The cluster engine 120 also allows an analyst to create tasks associated with the clusters. The operations of the cluster engine 120 are discussed in detail below in conjunction with FIGS. 4 and 5. In one embodiment, the cluster engine 120 generates clusters automatically, for subsequent review by analysts. Analysts may also assign tasks to themselves via a workflow UI. The workflow engine 125 consumes scores generated by the cluster engine 120. For example, the workflow engine 125 may present an analyst with clusters generated, scored, and ordered by the cluster engine 120.

The client 135 represents one or more software applications configured to present data and translate input, from the analyst, into requests for data analyses by the application server 115. In one embodiment, the client 135 and the application server 115 are coupled together. However, several clients 135 may execute on the client computer 130 or several clients 135 on several client computers 130 may interact with the application server 115. In one embodiment, the client 135 may be a browser accessing a web service.

While the client 135 and application server 115 are shown running on distinct computing systems, the client 135 and application server 115 may run on the same computing system. Further, the cluster engine 120 and the workflow engine 125 may run on separate applications servers 115, on separate server computing systems, or some combination thereof. Additionally, a history service may store the results generated by an analyst relative to a given cluster In one embodiment, the cluster data sources 160 provide data available to the cluster engine to create clusters from a set of seeds. Such data sources may include relational data sources, web services data, XML data, etc. For example, the data sources may be related to customer account records stored by a financial institution. In such a case, the data sources may include a credit card account data, bank account data, customer data, and transaction data. The data may include data attributes such as account numbers, account balances, phone numbers, addresses, and transaction amounts, etc. Of course, cluster data sources 160 is included to be representative of a variety of data available to the server computer system 110 over network 150, as well as locally available data sources.

The database 140 may be a Relational Database Management System (RDBMS) that stores the data as rows in relational tables. While the database 140 is shown as a distinct computing system, the database 140 may operate on the same server computing system 110 as the application server 115.

Figure 2:
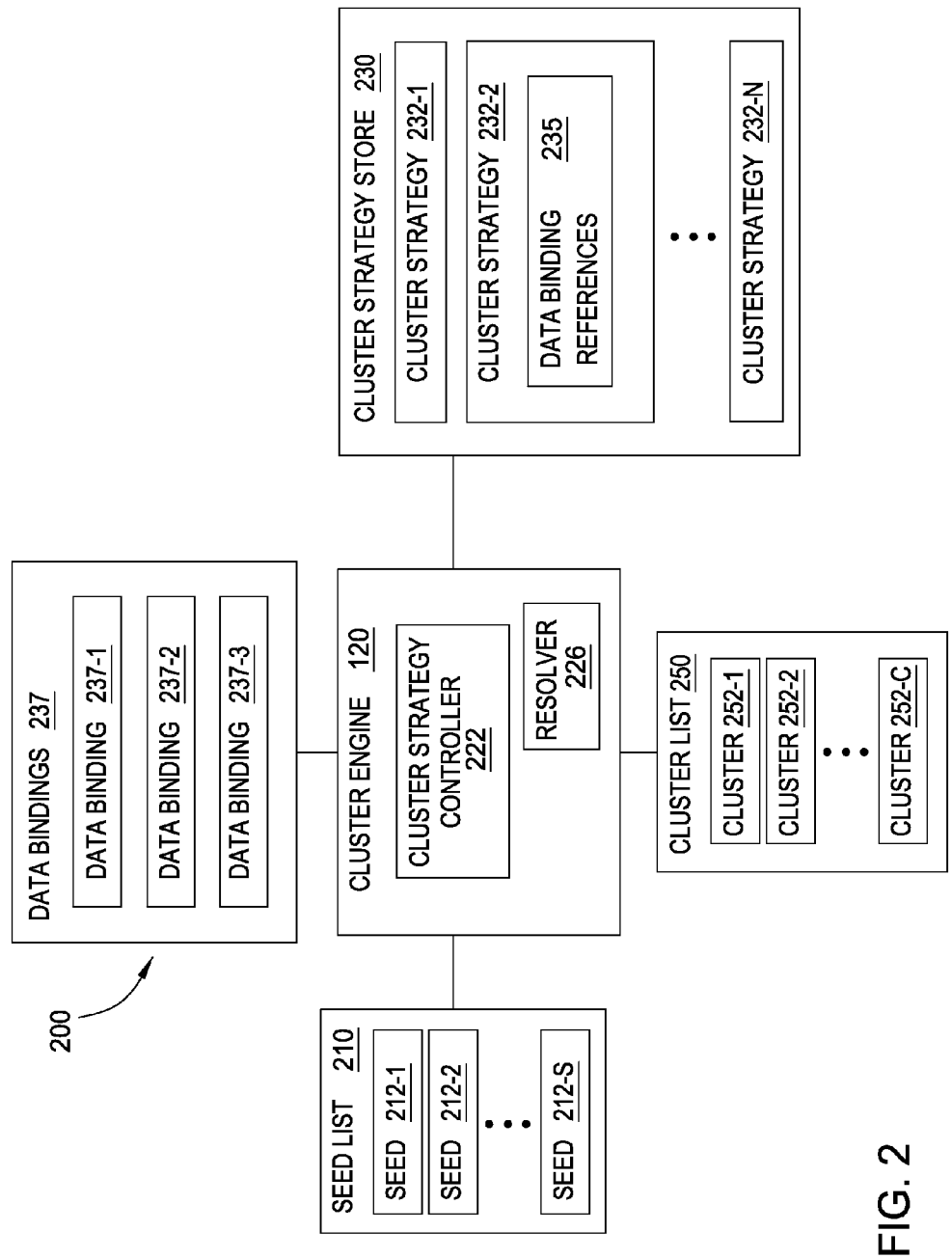
FIG. 2 illustrates the generation of clusters by the data analysis system, according to one embodiment.

FIG. 2 illustrates the generation of clusters by data analysis system 200, according to one embodiment. As shown, the data analysis system 200 interacts with a seed list 210, a cluster list 250, and a cluster strategy store 230. The seed list 210 includes seeds 212-1, 212-2 . . . 212-S and the cluster list 250 includes clusters 252-1, 252-2 . . . 252-C. The cluster engine 120 is configured as a software application or thread that generates the clusters 252-1, 252-2 . . . 252-C from the seeds 212-1, 212-2 . . . 212-S.

Seeds 212 are the starting point for generating a cluster 252. To generate a cluster, the cluster engine 120 retrieves a given seed 212 from the seed list 210. The seed 212 may be an arbitrary data entity within the database 140, such as a customer name, a customer social security number, an account number, or a customer telephone number.

The cluster engine 120 generates the cluster 252 from the seed 212. In one embodiment, the cluster engine 120 generates the cluster 252 as a collection of data entities and the relationships between the various data entities. As noted above, the cluster strategy executes data bindings in order to add each additional layer of objects to the cluster. For example, the cluster engine 120 could generate the cluster 252 from a seed credit card account. The cluster engine 120 first adds the credit card account to the cluster 252. The cluster engine 120 could then add customers related to the credit card account to the cluster 252. The cluster engine 120 could complete the cluster 252 by adding additional credit card accounts related to those customers. As the cluster engine 120 generates the cluster 252, the cluster engine 120 stores the cluster 252 within the cluster list 250. The cluster 252 may be stored as a graph data structure. The cluster list 250 may be a collection of tables in the database 140. In such a case, there may be a table for the data entities of the cluster 252, a table for the relationships between the various data entities, a table for the attributes of the data entities, and a table for a score of the cluster 252. The cluster list 250 may include clusters 252 from multiple investigations. Note that the cluster engine 120 may store portions of the cluster 252 in the cluster list 250 as the cluster engine 120 generates the cluster 252. Persons skilled in the art will recognize that many technically feasible techniques exist for creating and storing graph data structures.

The cluster strategy store 230 includes cluster strategies 232-1, 232-2 . . . 232-N. Each cluster strategy may include references 235 to one or more data bindings 237. As noted, each data binding may be used to identify data that may grow a cluster (as determined by the given search strategy 232). The cluster engine 120 executes a cluster strategy 232 to generate the cluster 252. Specifically, the cluster engine 120 executes the cluster strategy 232 selected by an analyst. The analyst may submit a selection of the cluster strategy 232 to the cluster engine 120 through the client 135.

Each cluster strategy 232 is configured as to perform an investigation processes for generating the cluster 252. Again, e.g., the cluster strategy 232 may include references 235 to a collection of data bindings executed to add layer after layer of data to a cluster. The investigation process includes searches to retrieve data entities related to the seed 212. For example, the cluster strategy 232 could start with a possibly fraudulent credit card account as the seed 212. The cluster strategy 232 would search for customers related to the credit card account, and then additional credit card accounts related to those customers. A different cluster strategy 232 could search for customers related to the credit card account, phone numbers related to the customers, additional customers related to the phone numbers, and additional credit card accounts related to the additional customers.

In one embodiment, the cluster strategy 232 includes a reference to at least one data binding 237. The cluster engine 120 executes the search protocol of specified by the data binding 237 to retrieve data, and the data returned by a given data binding forms a layer within the cluster 252. For instance, the data binding 237 could retrieve sets of customers related to an account by an account owner attribute. The data binding 237 retrieves the set of related data entities from a data source. For instance, the data binding 237-1 could define specify a database query to perform against a database. Likewise, the data binding 237-2 could define a connection to a remote relational database system and the data binding 237-3 could define a connection and query against a third-party web service. Once retrieved, the cluster strategy 232 may evaluate whether the returned data should be added to a cluster being grown from a given seed 212. Multiple cluster strategies 232 may reference a given data binding 237. The analyst can update the data binding 237, but typically updates the data binding 237 only if the associated data source changes. A cluster strategy 232 may also include a given data binding 237 multiple times. For example, executing a data binding 237 using one seed 212 may generate additional seeds for that data binding 237 (or generate seeds for another data binding 237). More generally, different cluster strategies 232-1, 232-2 . . . 232-N may include different arrangements of various data bindings 237 to generate different types of clusters 252.

The cluster strategy 232 may specify that the cluster engine 120 use an attribute from the related data entities retrieved with one data binding 237, as input to a subsequent data binding 237. The cluster engine 120 uses the subsequent data binding 237 to retrieve a subsequent layer of related date entities for the cluster 252. For instance, the cluster strategy 232 could specify that the cluster engine 120 retrieve a set of credit card account data entities with a first data binding 237-1. The cluster strategy 232 could also specify that the cluster engine 120 then use the account number attribute from credit card account data entities as input to a subsequent data binding 237-2. The cluster strategy 232 may also specify filters for the cluster engine 120 to apply to the attributes before performing the subsequent data binding 237. For instance, if the first data binding 237-1 were to retrieve a set of credit card account data entities that included both personal and business credit card accounts, then the cluster engine 120 could filter out the business credit card accounts before performing the subsequent data binding 237-2.

In operation, the cluster engine 120 generates a cluster 252-1 from a seed 212-1 by first retrieving a cluster strategy 232. Assuming that the analyst selected a cluster strategy 232-2, then the cluster engine 120 would retrieve the cluster strategy 232-2 from the cluster strategy store 230. The cluster engine 120 could then retrieve the seed 212-1 as input to the cluster strategy 232-2. The cluster engine 120 would execute the cluster strategy 232-2 by retrieving sets of data by executing data bindings 237 referenced by the cluster strategy 232-2. For example, the cluster strategy could execute data bindings 237-1, 237-2, and 237-3. The cluster engine 120 evaluates data returned by each data binding 237 to determine whether to use that data to grow the cluster 252-1. The cluster engine 120 may then use elements of the returned data as input to the next data binding 237. Of course, a variety of execution paths are possible for the data bindings 237. For example, assume one data binding 237 returned a set of phone numbers. In such a case, another data binding 237 could evaluate each phone number individually. As another example, one data binding 237 might use input parameters obtained by executing multiple, other data bindings 237. More generally, the cluster engine 120 may retrieves data for each data binding referenced by the cluster strategy 232-2. The cluster engine 120 then stores the complete cluster 252-1 in the cluster list 250.

As the cluster engine 120 generates the clusters 252-1, 252-2 . . . 252-C from seeds 212-1, 212-2 . . . 212-S, the cluster list 250 may include overlapping clusters 252. Two clusters 252-1 and 252-C overlap if both clusters 252-1 and 252-C include a common data entity. Oftentimes, a larger cluster 252 formed by merging two smaller clusters 252-1 and 252-C may be a better investigation starting point than the smaller clusters 252-1 and 252-C individually. The larger cluster 252 may provide additional insight or relationships, which may not be available if the two clusters 252-1 and 252-C remain separate.

In one embodiment, the cluster engine 120 includes a resolver 226 that is configured to detect and merge two overlapping clusters 252 together. The resolver 226 compares the data entities within a cluster 252-1 to the data entities within each one of the other clusters 252-2 through 252-C. If the resolver 226 finds the same data entity within the cluster 252-1 and a second cluster 252-C, then the resolver 226 may merge the two clusters 252-1 and 252-C into a single larger cluster 252. For example, the cluster 252-1 and cluster 252-C could both include the same customer. The resolver 226 would compare the data entities of cluster 252-1 to the data entities of cluster 252-C and detect the same customer in both clusters 252. Upon detecting the same customer in both clusters 252, the resolver 226 could merge the cluster 252-1 with cluster 252-C. The resolver 226 may test each pair of clusters 252 to identify overlapping clusters 252. Although the larger clusters 252 may be better investigation starting points, an analyst may want to understand how the resolver 226 formed the larger clusters 252. The resolver 226, stores a history of each merge.

After the cluster engine generates a group of clusters from a given collection of seeds (and after merging or resolving the cluster), the cluster engine 120 may score, rank, or otherwise order the clusters relative to a scoring strategy 442.

In one embodiment, the analysis system 100, and more specifically, the cluster engine 120 receives a list of seeds to generate a group of clusters, subsequently ranked, ordered, and presented to analysts. That is, the cluster engine 120 consumes seeds generated by other systems. Alternatively, in other embodiments, cluster engine 120 may generate the seeds 212-1, 212-2 . . . 212-S. For instance, the cluster engine 120 may include a lead generation strategy that identifies data entities as potential seeds 212. The lead generation strategy may apply to a particular business type, such as credit cards, stock trading, or insurance claims and may be run against a cluster data source 160 or an external source of information.

Figure 3B:
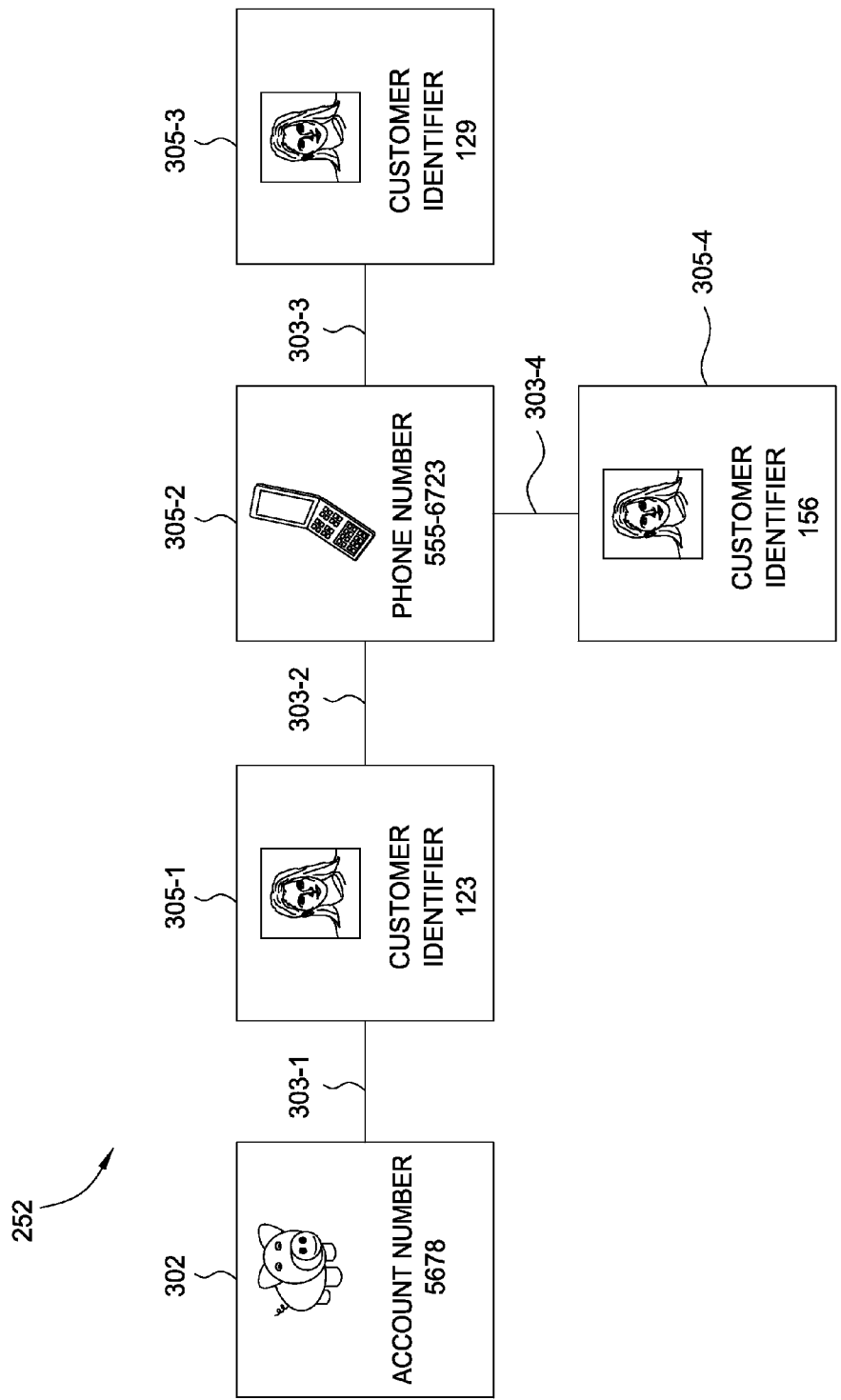

FIGS. 3A-3C illustrate the growth of a cluster 252 of related data entities, according to one embodiment. As shown in FIG. 3A, a cluster 252 includes a seed data entity 302, links 303-1 and 303-2, and related data entities 305-1 and 305-2. The cluster 252 is based upon a seed 212. The cluster engine 120 builds the cluster 252 by executing a cluster strategy 232 with the following searches:
 Find seed owner
 Find all phone numbers related to the seed owner
 Find all customers related to the phone numbers
 Find all accounts related to the customers
 Find all new customers related to the new accounts
Assuming that the seed 212 were a fraudulent credit card account, then the cluster engine 120 would add the credit card account to the cluster 252 as the seed data entity 302. The cluster engine 120 would then use the account owner attribute of the credit card account as input to a data binding 237. The cluster engine 120 would execute the search protocol of data binding 237 to retrieve the customer data identifying the owner of the fraudulent credit card account. The cluster engine 120 would then add the customer data to the cluster 252 as the related data entity 305-1. The cluster engine 120 would also add the account owner attribute as the link 303-1 that relates the account number to the customer data of the owner. The cluster engine 120 would execute the next search of the cluster strategy 232 by inputting the customer identifier attribute of the customer data into a data binding 237 to retrieve a phone data. The cluster engine 120 would then add the phone data as the related data entity 305-2 and the customer identifier attribute as the link 303-2 between the customer data and the phone data. At this point in the investigation process, the cluster 252 would include the seed data entity 302, two links 303-1 and 303-2, and two related data entities 305-1 and 305-2. That is, the cluster 252 includes the fraudulent credit card account, the customer data of the owner of the credit card, and the phone number of the owner. By carrying the investigation process further, the cluster engine 120 could reveal further related information—e.g., additional customers or potentially fraudulent credit card accounts.

Turning to FIG. 3B, the cluster engine 120 would continue executing the cluster strategy 232 by searching for additional account data entities related to the phone number of the owner of the fraudulent credit card account. As discussed, the phone number would be stored as related data entity 305-2. The cluster engine 120 would input the phone owner attribute of the phone number to a data binding 237. The cluster engine 120 would execute the search protocol of data binding 237 to retrieve the data of two additional customers, which the cluster engine 120 would store as related data entities 305-3 and 305-4. The cluster engine 120 would add the phone owner attribute as the links 303-3 and 304-4 between the additional customers and the phone number.

FIG. 3C shows the cluster 252 after the cluster engine 120 performs the last step of the cluster strategy 232. For example, the cluster engine 120 would use the customer identifier attribute of the related data entity 305-3 and 305-4 to retrieve and add additional account data entities as the related data entities 305-5 and 305-6. The cluster engine 120 would couple the related data entities 305-5 and 305-6 to the related data entities 305-3 and 305-4 with the customer identifier attributes stored as links 303-5 and 303-6. Thus, the cluster 252 would include six related data entities 305 related by six links 303, in addition to the seed data entity 302. The analyst could identify and determine whether the additional data account entities, stored as related data entities 305-3 and 305-4, represent fraudulent credit card accounts more efficiently, than if the analyst started an investigation with only the seed 212. As the foregoing illustrates, with the cluster engine 120 and cluster strategy 232, the analyst is advantageously able to start an investigation from a cluster 252 that already includes several related data entities 305.

FIG. 4 illustrates the ranking of clusters 252 by the data analysis system 100 shown in FIG. 1, according to one embodiment of the present invention. As shown, FIG. 4 illustrates some of the same elements as shown in FIG. 1 and FIG. 2. In addition, FIG. 4 illustrates a scoring strategy store 440, coupled to the workflow engine 125. The cluster engine 120 coupled to the cluster list 250. The scoring strategy store 440 includes scoring strategies 442-1, 442-2 . . . 442-R.

The cluster engine 120 executes a scoring strategy 442 to score a cluster 252. For example, the cluster engine 120 may generate a cluster, via a cluster strategy/data bindings, and attempt to resolve it with existing clusters. Thereafter, the cluster engine 120 may score the resulting cluster with any scoring strategies associated with a given cluster generation strategy. In one embodiment, the score for a cluster may be a meta score generated as an aggregation of scores generated for different aspects, metrics, or data of a cluster. Ordering for a group of clusters, (according to a given scoring strategy) may be performed done on demand when requested by a client. Alternatively, the analyst may select of a scoring strategy 442 to the cluster engine 120 through the client 135 or the analyst may include the selection within a script or configuration file. In other embodiments, the cluster engine 120 may execute several scoring strategies 442 to determine a combined score for the cluster 252.

The scoring strategy 442 specifying an approach for scoring a cluster 252. The score may indicate the relative importance or significance of a given cluster 252. For instance, the cluster engine 120 could execute a scoring strategy 442-1 to determine a score by counting the number of a particular data entity type within the cluster 252. Assume, e.g., a data entity corresponds to a credit account. In such a case, a cluster with a large number of accounts opened by a single individual (possibly within a short time) might correlate with a higher fraud risk. Of course, a cluster score may be related to a high risk of fraud based on the other data in the cluster, as approaite for a given case. More generally, each scoring strategy 442 may be tailored based on the data in clusters created by a given cluster strategy 230 and the particular type of risk or fraud (or amounts at risk).

In operation, the cluster engine 120 scores a cluster 252-1 by first retrieving a scoring strategy 442. For example, assume a analyst selects scoring strategy 442-1. In response, the cluster engine 120 retrieves the scoring strategy 442-1. The cluster engine 120 also retrieves the cluster 252-1 from the cluster list 250. After determining the score of the cluster 252-1, the cluster engine 120 may store the score with the cluster 252-1 in the cluster list 250.

The cluster engine 120 may score multiple clusters 252-1, 252-2 . . . 252-C in the cluster list 250. The cluster engine 120 may also rank the clusters 252-1, 252-2 . . . 252-C based upon the scores. For instance, the cluster engine 120 could rank the cluster 252-1, 252-2 . . . 252-C from highest score to lowest score.

Figure 5:
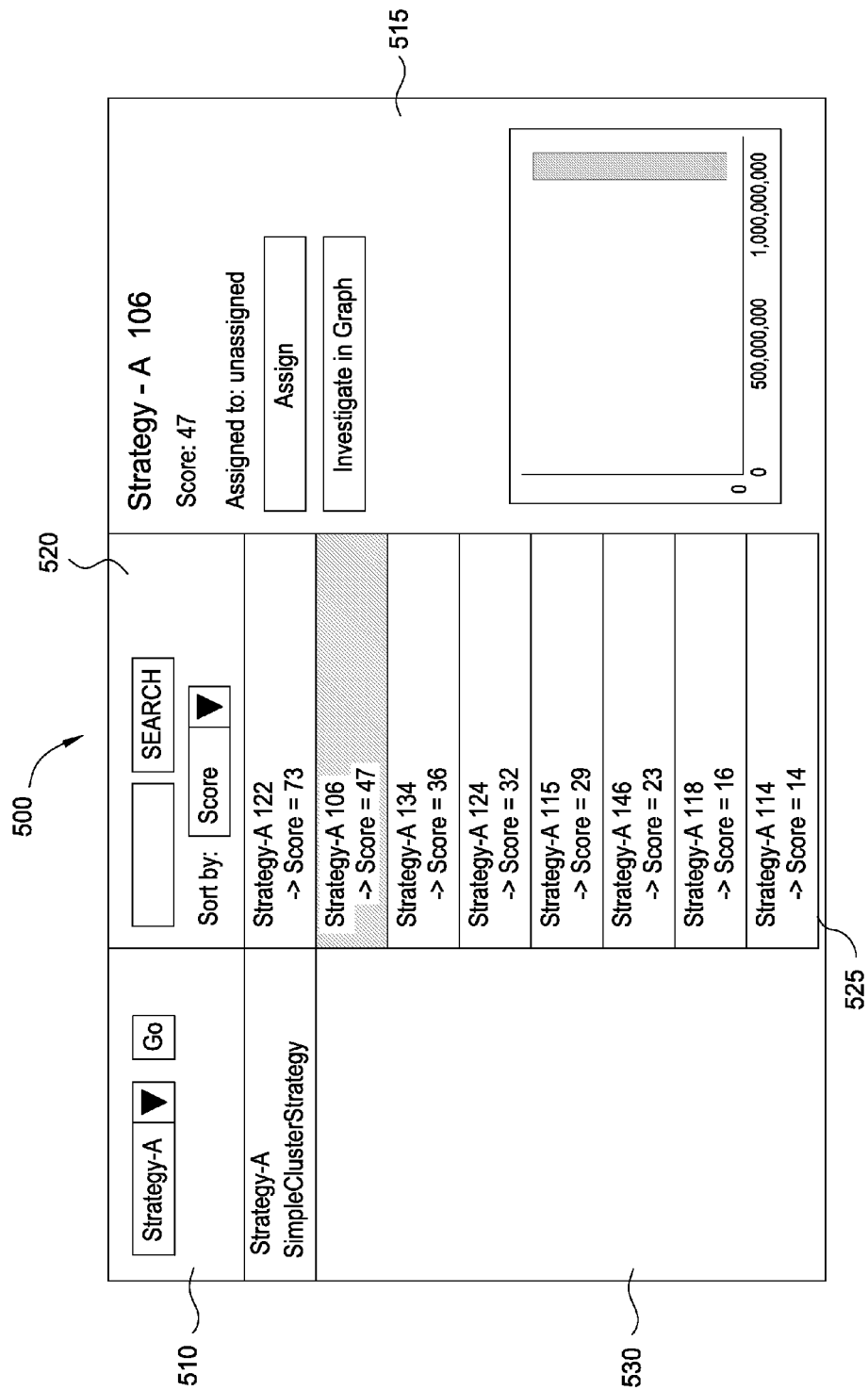
FIG. 5 illustrates an example cluster analysis user interface (UI), according to one embodiment.

FIG. 5 illustrates an example cluster analysis UI 500, according to one embodiment. As discussed, the workflow engine 125 is configured to present the cluster analysis UI 500. As shown, the cluster analysis UI 500 includes a lead box 510, a cluster strategy box 530, a cluster summary list 525, a cluster search box 520, and a cluster review window 515. The workflow engine 125 may generate the cluster analysis UI 500 as a web application or a dynamic web page displayed within the client 135.

The lead box 510 allows the analyst to select a seed list 210 or a suitable lead generation strategy. The lead generation strategy generates a seed list 210. The lead generation strategy may generate a seed list 210 from the database 140 or an external source of information (e.g., a cluster data source 160).

The cluster strategy box 530 displays the cluster strategies 232 that the cluster engine 120 ran against the seed list 210. The cluster engine 120 may execute multiple cluster strategies 232 against the seed list 210, so there may be multiple cluster strategies 232 listed in the cluster strategy box 530. The analyst may click on the name of a given cluster strategy 232 in the cluster strategy box 530 to review the clusters 252 that the cluster strategy 232 generated.

The workflow engine 125 displays summaries of the clusters 252 in the cluster summary list 525. For example, the summaries, may include characteristics of the clusters 252, such as identifiers, the scores, or analysts assigned to analyze the clusters 252. The workflow engine 125 can select the clusters 252 for the display in the cluster summary list 525 according to those or other characteristics. For instance, the workflow engine 125 could display the summaries in the order of the scores of the clusters 252, where a summary of the highest scoring cluster 252 is displayed first.

The workflow engine 125 controls the order and selection of the summaries within the cluster summary list 525 based upon the input from the analyst. The cluster search box 520 includes a search text box coupled to a search button and a pull-down control. The analyst may enter a characteristic of a cluster 252 in the search text box and then instruct the workflow engine 125 to search for and display clusters 252 that include the characteristic by pressing the search button. For example, the analyst could search for clusters with a particular score. The pull-down control includes a list of different characteristics of the clusters 252, such as score, size, assigned analyst, or date created. The analyst may select one of the characteristics to instruct the workflow engine 125 to present the summaries of the clusters 252 arranged by that characteristic.

The workflow engine 125 is also configured to present details of a given cluster 252 within the cluster review window 515. The workflow engine 125 displays the details of the cluster 252, e.g., the score, or average account balances within a cluster, when the analyst clicks a mouse pointer on the associated summary within the cluster summary list 525. The workflow engine 125 may present details of the cluster 252, such as the name of the analyst assigned to analyze the cluster 252, the score of the cluster 252, and statistics or graphs generated from the cluster 252. These details allow the analyst to determine whether to investigate the cluster 252 further. The cluster review window 515 also includes a button which may be clicked to investigate a cluster 252 within a graph and an assign button for assigning a cluster to an analyst.

The analyst can click a mouse pointer on the button to investigate the cluster 252 within an interactive graph. The interactive representation is a visual graph of the cluster 252, where icons represent the entities of the cluster 252 and lines between the icons represent the links between entities of the cluster 252. For example, the workflow engine 125 could display the interactive graph of the cluster 252 similar to the representation of the cluster 252 in FIG. 3C. The interactive representation allows the analyst to review the attributes of the related data entities or perform queries for additional related data entities.

An administrative user can click a mouse pointer on the assign button to assign the associated cluster 252 to an analyst. The workflow engine 125 also allows the administrative user to create tasks associated with the clusters 252, while the administrative user assigns the cluster 252. For example, the administrative user could create a task for searching within the three highest scoring clusters 252 for fraudulent credit card accounts. The workflow engine 125 may display the summaries in the cluster summary list 525 according to the names of the analysts assigned to the clusters 252. Likewise, the workflow engine 125 may only display summaries for the subset of the clusters 252 assigned to an analyst.

The interface shown in FIG. 5 is included to illustrate one exemplary interface useful for navigating and reviewing clusters generated using the cluster engine 120 and the workflow engine 125. Of course, one of skill in the art will recognize that a broad variety of user interface constructs could be used to allow the analyst to select cluster strategies 232, scoring strategies 242, or seed generation strategies, initiate an investigation, or review and analyze the clusters 252. For example, the workflow engine 125 may display additional controls within the cluster analysis UI 500 for controlling the cluster generation process and selecting cluster strategies 232 or scoring strategies 242. Also, the workflow engine 125 may not display the lead box 510 or the options to select a lead generation strategy. In addition, although the workflow engine 125 generates the cluster analysis UI 500, in different embodiments, the cluster analysis UI 500 is generated by a software application distinct from the workflow engine 125. Further, in different embodiments, the cluster review window 515 is configured to display a preview of the cluster 252 or additional statistics generated from the cluster 252. As such, an interactive representation of the cluster 252 may be presented in an additional UI or the cluster 252 may be exported to another software application for review by the analyst.

Figure 6:
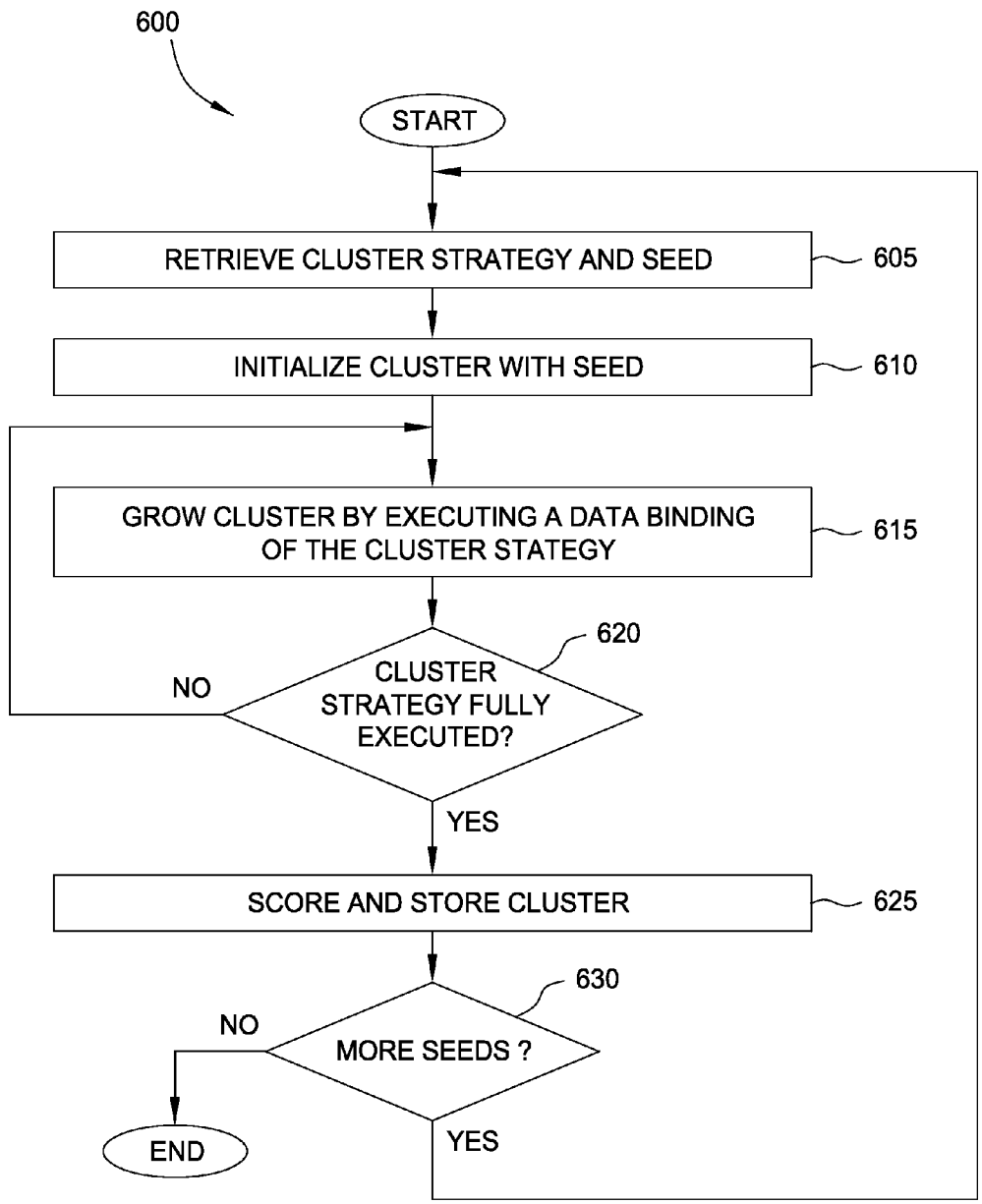
FIG. 6 is a flow diagram of method steps for generating clusters, according to one embodiment.

FIG. 6 is a flow diagram of method steps for generating clusters, according to one embodiment. Although the method steps are described in conjunction with the systems of FIGS. 1 and 2, persons skilled in the art will understand that any system configured to perform the method steps, in any order, is within the scope of the present invention. Further, the method 600 may be performed in conjunction with method 700 for scoring a cluster, described below.

As shown, method 600 begins at step 605, where the cluster engine 120 retrieves a cluster strategy 232 and a seed 212. Once a cluster strategy is selected The cluster engine 120 identifies a list of seeds to build clusters using the selected cluster strategy. At step 610, the cluster engine 120 initializes a cluster 252 with one of the seeds in the list. The cluster 252 is stored as a graph data structure. The cluster engine 120 initializes the graph data structure, and then adds the seed 212-1 to the graph data structure as the first data entity.

At step 615, the cluster engine 120 grows the cluster 252 by executing the search protocol of a data binding 237 from the cluster strategy 232-2. The cluster strategy 232-2 includes a series of data bindings 237 that the cluster engine 120 executes to retrieve related data entities. A given data binding 237 may include queries to execute against a cluster data source 160 using the seed as an input parameters. For example, if the seed 212-1 were an account number, then the data binding 237 might retrieve the data identifying the owner of the account with the account number. After retrieving this information, the cluster engine 120 would add the customer data entity to the cluster as a related data entity and the account owner attribute as the link between the seed 212-1 and the related data entity. After retrieving the related data entities, the cluster engine 120 adds them to the cluster 252.

At step 620, the cluster engine 120 determines if the cluster strategy 232-2 is fully executed. If so the method 600 returns to step 615 to execute additional data bindings for a given seed. Once the cluster strategy is executed for that seed, the cluster engine 120 may determine and assign a score to that cluster (relative to a specified scoring strategy). After generating clusters for a group of seeds, such clusters may be ordered or ranked based on the relative scores. Doing so allows an analyst to rapidly identify and evaluate clusters determined to represent a high risk of fraud (or having high amounts at risk).

At step 625, the cluster engine 120 stores the cluster 252 in cluster list 250. The cluster list 250 is a collection of tables within a relational database, where a table may include the seed and related data entities of the cluster 252 and another table may include links between the related data entities of the cluster 252. At step 630, the cluster engine 120 determines if there are more seeds 212 to analyze in the seed list 210. If so, the method 600 returns to step 605 to generate another cluster from the next seed. Otherwise, the method 600 ends. Note, while method 600 describes a single cluster being generated, one of skill in the art will recognize that the cluster generation process illustrated by method 600 may be performed in parallel.

Figure 7:
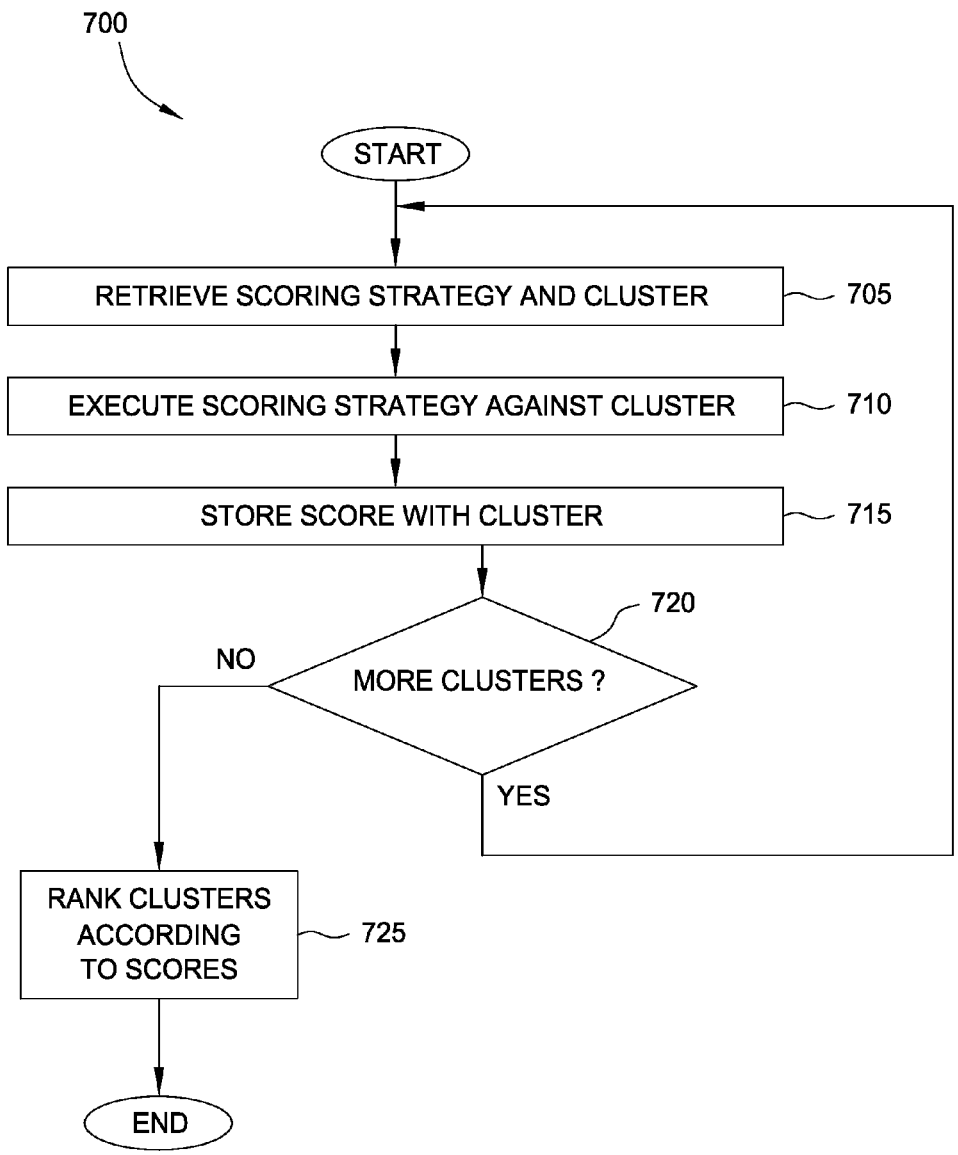
FIG. 7 is a flow diagram of method steps for scoring clusters, according to one embodiment.

FIG. 7 is a flow diagram of method steps for scoring clusters, according to one embodiment. Although the method steps are described in conjunction with the systems of FIGS. 1 and 4, persons skilled in the art will understand that any system configured to perform the method steps, in any order, is within the scope of the present invention.

As shown, method 700 begins at step 705, where the cluster engine 120 retrieves a scoring strategy 442 and a cluster 252 (e.g., a cluster just created using the method 600 of FIG. 6). In other cases, he cluster engine 120 may retrieve the scoring strategy 442 associated with a stored cluster. Other alternatives include an analyst selecting a scoring strategy 442 through the client 135, the cluster engine 120 via the cluster analysis UI 500, a script, or a configuration file. The cluster engine 120 retrieves the selected scoring strategy 442 from the scoring strategy store 440. The cluster engine 120 retrieves the cluster 252 from the cluster list 250.

At step 710, the cluster engine 120 executes the scoring strategy 442 against the cluster 252. The scoring strategy 442 specifies characteristics of the related data entities within the cluster 252 to aggregate. The cluster engine 120 executes the scoring strategy 442 by aggregated the specified characteristics together to determine a score. For instance, the engine 120 could aggregate the account balances of related data entities that are account data entities. In such a case, the total amount of dollars included within the balances of the account data entities of the cluster 252 could be the score of the cluster 252.

At step 715, the cluster engine 120 stores the score with the cluster 252 in the cluster list 250. At step 720, the cluster engine 120 determines if there are more clusters 252 to score. For example, in one embodiment, a set of clusters may be re-scored using an updated scoring strategy. In other cases, the cluster engine may score each cluster when it is created from a seed (based on a given cluster generation and corresponding scoring strategy). If more clusters remain to be scored (or re-scored), the method 700 returns to step 705.

At step 725, the cluster engine 125 ranks the clusters 252 according to the scores of the clusters 252. For example, after re-scoring a set of clusters (or after scoring a group of clusters generated from a set of seeds), the cluster engine 125 may rank the clusters 252 from highest score to lowest score. The ranking may be used to order a display of summaries of the clusters 252 presented to the analyst. The analyst may rely upon the ranking and scores to determine which clusters 252 to analyze first. The ranking and sorting may generally be performed on-demand when an analyst is looking for a cluster to investigate. Thus, the ranking need not happen at the same time as scoring. And further, the clusters may be scored (and later ranked) using different raking strategies.

Figure 8:
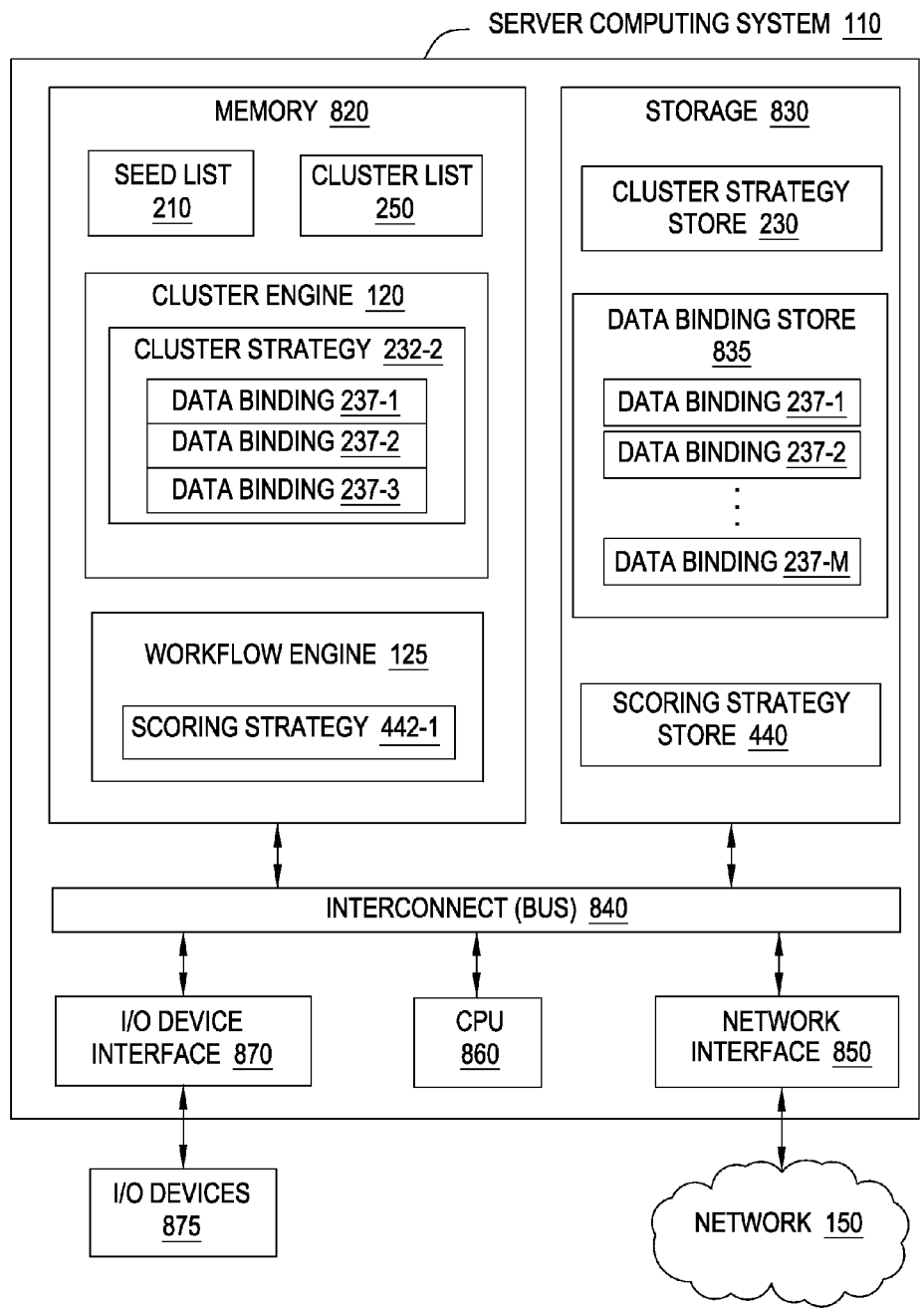
FIG. 8 illustrates components of a server computing system, according to one embodiment.

FIG. 8 illustrates components of a server computing system 110, according to one embodiment. As shown, the server computing system 110 includes, a central processing unit (CPU) 860, a network interface 850, a memory 820, and a storage 830, each connected to an interconnect (bus) 840. The server computing system 110 may also include an I/O device interface 870 connecting I/O devices 875 (e.g., keyboard, display and mouse devices) to the computing system 110. Further, in context of this disclosure, the computing elements shown in server computing system 110 may correspond to a physical computing system (e.g., a system in a data center) or may be a virtual computing instance executing within a computing cloud.

The CPU 860 retrieves and executes programming instructions stored in memory 820 as well as stores and retrieves application data residing in memory 820. The bus 840 is used to transmit programming instructions and application data between the CPU 860, I/O device interface 870, storage 830, network interface 850, and memory 820. Note that the CPU 860 is included to be representative of a single CPU, multiple CPUs, a single CPU having multiple processing cores, a CPU with an associate memory management unit, and the like. The memory 820 is generally included to be representative of a random access memory. The storage 830 may be a disk drive storage device. Although shown as a single unit, the storage 830 may be a combination of fixed and/or removable storage devices, such as fixed disc drives, removable memory cards, or optical storage, network attached storage (NAS), or a storage area-network (SAN).

Illustratively, the memory 820 includes a seed list 210, a cluster engine 120, a cluster list 250, and a workflow engine 125. The cluster engine 120 includes a cluster strategy 232-2. The particular cluster strategy 232-2 includes data bindings 237-1, 237-2, and 237-3, with which the cluster engine 120 accesses the cluster data source 160. The workflow engine 125 includes a scoring strategy 442-1.

Illustratively, the storage 830 includes a cluster strategy store 230, data bindings store 835, and a scoring strategy store 440. As discussed the cluster strategy store 230 may include a collection of different cluster strategies 232, such as cluster strategy 232-2. The cluster strategy store 230 may be a directory that includes the cluster strategies 232-1, 232-2 . . . 232-N as distinct modules. The scoring strategy store 440 may include a collection of different scoring strategies 442, such as scoring strategy 442-2 and may also be a directory of distinct modules. The data binding store 835 includes data bindings 237-1, 237-2 . . . 237-M, which may also be stored as distinct modules within a directory.

Although shown in memory 820, the seed list 210, cluster engine 120, cluster list 250, and workflow engine 125, may be stored in memory 820, storage 830, or split between memory 820 and storage 830. Likewise, copies of the cluster strategy 232-2, data binding 237-1, 237-2, and 237-3, and scoring strategy 442-2 may be stored in memory 820, storage 830, or split between memory 820 and storage 830.

Note, while financial fraud using credit card accounts is used as a primary reference example in the discussion above, one of ordinary skill in the art will recognize that the techniques described herein may be adapted for use with a variety of data sets. For example, information from data logs of online systems could be evaluated as seeds to improve cyber security. In such a case, a seed could be a suspicious IP address, a compromised user account, etc. From the seeds, log data, DHCP logs, IP blacklists packet captures, webapp logs, and other server and database logs could be used to create clusters of activity related to the suspicions seeds. Other examples include data quality analysis used to cluster transactions processed through a computer system (whether financial or otherwise).

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. Therefore, the scope of the present invention is determined by the claims that follow.

What is claimed is:

1. A computer-implemented method for generating a cluster of related data entities, the method comprising:

communicating with one or more electronic data stores storing a plurality of data entities and respective data entity attributes, the one or more electronic data stores in communication with one or more hardware computer processors, the one or more hardware computer processors configured with specific computer executable instructions, and the plurality of data entities related to financial data and including at least one of:
an account data entity,
a transaction data entity,
a customer data entity, or
a phone number data entity;

retrieving, from the one or more electronic data stores and by the one or more hardware computer processors, a seed data entity selected from the plurality of data entities;

adding, by the one or more hardware computer processors, the seed data entity to a data entity cluster;

identifying, by the one or more hardware computer processors, at least one data entity attribute associated with the seed data entity;

determining, by the one or more hardware computer processors and based on a cluster strategy and the at least one data entity attribute, one or more additional data entities related to the seed data entity, wherein the cluster strategy is configured to identify related data entities for detection of possible fraudulent financial activity, wherein the cluster strategy includes one or more search protocols, and wherein determining one or more additional data entities related to the seed data entity comprises:

executing at least one search protocol on the one or more electronic data stores to access particular data entities; and evaluating the particular data entities returned by the at least one search protocol to identify one or more additional data entities for inclusion in the data entity cluster, the one or more additional data entities sharing the at least one data entity attribute with the seed data entity; and adding, by the one or more hardware computer processors and based on the cluster strategy, the one or more additional data entities to the data entity cluster,
wherein the data entity cluster is useable by an analyst to determine various data entities related to each other and to possible fraudulent financial activity,
wherein a first search protocol returns particular data entities that are used as data parameter inputs to a second search protocol.

2. The method of claim 1 further comprising:
comparing, by the one or more hardware computer processors, data entities associated with the data entity cluster to data entities associated with a second data entity cluster; and
in response to determining that at least one data entity associated with the data entity cluster shares an attribute with and/or is related to at least one data entity associated with the second data entity cluster, merging the data entity cluster and the second data entity cluster.

3. The method of claim 1, wherein the at least one search protocol uses the data entity seed as a data parameter input to the at least one search protocol.

4. The method of claim 1, wherein the first search protocol searches for particular data entities in a first electronic data store and the second search protocol searches for particular data entities in a second electronic data store.

5. The method of claim 1 further comprising:
identifying, by the one or more hardware computer processors, at least one other data entity attribute associated with the one or more additional data entities;
determining, by the one or more hardware computer processors and based on the cluster strategy and the at least one other data entity attribute, one or more tertiary data entities related to the one or more additional data entities; and
adding, by the one or more hardware computer processors and based on the cluster strategy, the one or more tertiary data entities to the data entity cluster.

6. The method of claim 1 further comprising:
assigning a ranking score to the data entity cluster, wherein the ranking score is used to order the data entity cluster relative to a plurality of other data entity clusters generated from respective data entity seeds according to the cluster strategy.

7. A non-transitory computer-readable storage medium storing computer-executable instructions that, when executed by a computer system, configure the computer system to perform operations comprising:
communicating with one or more electronic data stores storing a plurality of data entities and respective data entity attributes, the plurality of data entities related to financial data and including at least one of:
an account data entity,
a transaction data entity,
a customer data entity, or
a phone number data entity;
retrieving, from the one or more electronic data stores, a seed data entity selected from the plurality of data entities;
adding the seed data entity to a data entity cluster;
identifying at least one data entity attribute associated with the seed data entity;
determining, based on a cluster strategy and the at least one data entity attribute, one or more additional data entities related to the seed data entity, wherein the cluster strategy is configured to identify related data entities for detection of possible fraudulent financial activity,
wherein the cluster strategy includes one or more search protocols, and wherein determining one or more additional data entities related to the seed data entity comprises:
executing at least one search protocol on the one or more electronic data stores to access particular data entities; and
evaluating the particular data entities returned by the at least one search protocol to identify one or more additional data entities for inclusion in the data entity cluster, the one or more additional data entities sharing the at least one data entity attribute with the seed data entity; and
adding, based on the cluster strategy, the one or more additional data entities to the data entity cluster,
wherein the data entity cluster is useable by an analyst to determine various data entities related to each other and to possible fraudulent financial activity,
wherein a first search protocol returns particular data entities that are used as data parameter inputs to a second search protocol.

8. The non-transitory computer-readable storage medium of claim 7, wherein the computer-executable instructions configure the computer system to perform further operations comprising:
comparing data entities associated with the data entity cluster to data entities associated with a second data entity cluster; and
in response to determining that at least one data entity associated with the data entity cluster shares an attribute with and/or is related to at least one data entity associated with the second data entity cluster, merging the data entity cluster and the second data entity cluster.

9. The non-transitory computer-readable storage medium of claim 7, wherein the at least one search protocol uses the data entity seed as a data parameter input to the at least one search protocol.

10. The non-transitory computer-readable storage medium of claim 7, wherein the first search protocol searches for particular data entities in a first electronic data store and the second search protocol searches for particular data entities in a second electronic data store.

11. The non-transitory computer-readable storage medium of claim 7, wherein the computer-executable instructions configure the computer system to perform further operations comprising:
Identifying at least one other data entity attribute associated with the one or more additional data entities;
determining, based on the cluster strategy and the at least one other data entity attribute, one or more tertiary data entities related to the one or more additional data entities; and
adding, based on the cluster strategy, the one or more tertiary data entities to the data entity cluster.

12. The non-transitory computer-readable storage medium of claim 7, wherein the computer-executable instructions configure the computer system to perform further operations comprising:
assigning a ranking score to the data entity cluster, wherein the ranking score is used to order the data entity cluster relative to a plurality of other data entity clusters generated from respective data entity seeds according to the cluster strategy.

13. A computer system comprising:
one or more non-transitory computer readable storage devices configured to store one or more software programs; and one or more hardware computer processors in communication with the one or more non-transitory computer readable storage devices and configured to execute the one or more software programs in order to cause the computer system to:
  communicate with one or more electronic data stores storing a plurality of data entities and respective data entity attributes, the plurality of data entities related to financial data and including at least one of:
    an account data entity,
    a transaction data entity,
    a customer data entity, or
    a phone number data entity;
  retrieve, from the one or more electronic data stores and by the one or more hardware computer processors, a seed data entity selected from the plurality of data entities;
  add, by the one or more hardware computer processors, the seed data entity to a data entity cluster;
  identify, by the one or more hardware computer processors, at least one data entity attribute associated with the seed data entity;
  determine, by the one or more hardware computer processors and based on a cluster strategy and the at least one data entity attribute, one or more additional data entities related to the seed data entity, wherein the cluster strategy is configured to identify related data entities for detection of possible fraudulent financial activity, wherein the cluster strategy includes one or more search protocols, and wherein determining one or more additional data entities related to the seed data entity comprises:
    executing at least one search protocol on the one or more electronic data stores to access particular data entities; and
    evaluating the particular data entities returned by the at least one search protocol to identify one or more additional data entities for inclusion in the data entity cluster, the one or more additional data entities sharing the at least one data entity attribute with the seed data entity; and
  add, by the one or more hardware computer processors and based on the cluster strategy, the one or more additional data entities to the data entity cluster,
  wherein the data entity cluster is useable by an analyst to determine various data entities related to each other and to possible fraudulent financial activity,
  wherein a first search protocol returns particular data entities that are used as data parameter inputs to a second search protocol.

14. The computer system of claim 13, wherein the one or more hardware computer processors are further configured to execute the one or more software programs in order to cause the computer system to:
  compare, by the one or more hardware computer processors, data entities associated with the data entity cluster to data entities associated with a second data entity cluster; and
  in response to determining that at least one data entity associated with the data entity cluster shares an attribute with and/or is related to at least one data entity associated with the second data entity cluster, merge the data entity cluster and the second data entity cluster.

15. The computer system of claim 13, wherein the at least one search protocol uses the data entity seed as a data parameter input to the at least one search protocol.

16. The computer system of claim 13, wherein the first search protocol searches for particular data entities in a first electronic data store and the second search protocol searches for particular data entities in a second electronic data store.

17. The computer system of claim 13, wherein the one or more hardware computer processors are further configured to execute the one or more software programs in order to cause the computer system to:
  identify, by the one or more hardware computer processors, at least one other data entity attribute associated with the one or more additional data entities;
  determine, by the one or more hardware computer processors and based on the cluster strategy and the at least one other data entity attribute, one or more tertiary data entities related to the one or more additional data entities; and
  add, by the one or more hardware computer processors and based on the cluster strategy, the one or more tertiary data entities to the data entity cluster.

18. The method of claim 13, wherein the one or more hardware computer processors are further configured to execute the one or more software programs in order to cause the computer system to:
  assign a ranking score to the data entity cluster, wherein the ranking score is used to order the data entity cluster relative to a plurality of other data entity clusters generated from respective data entity seeds according to the cluster strategy.

* * * * *

UNITED STATES PATENT AND TRADEMARK OFFICE
CERTIFICATE OF CORRECTION

PATENT NO.         : 8,788,405 B1                                    Page 1 of 1
APPLICATION NO.    : 13/968265
DATED              : July 22, 2014
INVENTOR(S)        : Matthew Sprague et al.

It is certified that error appears in the above-identified patent and that said Letters Patent is hereby corrected as shown below:

In the Specification

In column 9 at line 26, Change "approaite" to --appropriate--.

In column 11 at line 30, Change "selected The" to --selected, the--.

In the Claims

In column 18 at line 38 (approx.), In Claim 18, Change "method" to --computer system--.

Signed and Sealed this
Third Day of March, 2015

Michelle K. Lee
*Deputy Director of the United States Patent and Trademark Office*